April 29, 1969 W. M. KAHN 3,441,910

DATA PROCESSING

Filed Aug. 15, 1966

INVENTOR
WILLIAM M. KAHN
BY *Wolf, Greenfield & Hieken*

1

3,441,910
DATA PROCESSING

William M. Kahn, Brookline, Mass., assignor to Barry Wright Corporation, Watertown, Mass., a corporation of Massachusetts Filed Aug. 15, 1966, Ser. No. 572,607
Int. Cl. G06f 7/08
U.S. Cl. 340—172.5 6 Claims

ABSTRACT OF THE DISCLOSURE

A recirculating memory system has a delay means, input gating means and input and output gating means. The input gating means receives both new input data and recirculated data provided by the output gating means. The output gating means delivers both data for recirculation to the input gating means and stored data for external use. There is input-output gating means that exchanges data with the input and output gating means having a read-write timing line that carries an enabling signal for only a single bit period at 64-bit-period intervals to enable the input-output gating means for 32 such staggered bit intervals during each 2048 bit period recirculation cycle period.

The present invention relates in general to data processing and more particularly concerns novel apparatus and techniques for exchanging data with a recirculating memory advancing data bits at a relatively high rate while employing apparatus that is relatively free from complexity and operable at switching speeds significantly less than required to handle the same bit rate by conventional techniques.

According to the invention, there is a source of timing signals, typically an oscillator of frequency corresponding to the data bit rate and means defining a recirculating memory for storing data bits and advancing them at bit rate in response to the timing signal. The stored data bits form a plurality of data words. Unlike conventional recirculating memory units, the data bits of a particular word are not contiguously arranged in consecutive sequence but are staggered and arranged so that the address of a particular data word in storage identifies the time relative to the beginning of a recircalation cycle when the bit of a given word is to be inserted into or withdrawn from memory. That is, contiguous bits of a word are interlaced among the bits of other words. Counter means are provided for receiving an address word representative of the address in the recirculating memory for insertion or withdrawal of a data word. The counter means is responsive to the timing signal for retarding the count stored therein once for each bit period. Means responsive to the occurrence of the counter means reaching a predetermined count, typically zero, are for then inserting into or ejecting from the recirculating memory means a data bit corresponding to a data bit in the word having the address identified by the count previously inserted into the counter means. The counter means may also be responsive to the timing signal for increasing the count stored therein, in which case the predetermined count would typically be $2^N-1$ for an N stage binary counter.

The process according to the invention may include the steps of recirculating a plurality of data bit cells at a prescribed data bit rate, inserting a count into a counter representative of the identity of staggered ones of said data bit cells where it is desired to inject or extract data bits that form a data word, stepping the count in said counter at the data bit rate in synchronism with the recirculation of the data bit cells, and inserting into or withdrawing from a data bit cell a data bit of a data word identified by the count previously inserted into the counter when the

2 count therein reaches a predetermined value, typically zero, thereby identifying the time relative to the start of a recirculation cycle at which the data bit cell thus selected is ready for accepting or expelling a data bit in a word at an address identified by the count previously inserted in the counter.

In a typical prior art system the recirculating memory stores the bits of a data word in contiguous data bit cells so that a number of contiguous groups of data bit cells may store a data word whereby an address number may identify a particular contiguous group of data bit cells that may accommodate a particular data word. Comparison means typically compares the progressively advanced number in a counter representative of the progress of a recirculation cycle relative to its initiation with an address number representative of a contiguous group of data bit cells to which access was sought for transfer of a data word. Upon sensing identity between the number in the counter and the address number, the comparison means provides a compare signal that activates appropriate gating means to exchange a data word between a contiguous array of data bit cells in the recirculating memory designated by the address number and external apparatus.

As an example, the recirculating memory may comprise 2048 bit cells divided into sixty-four 32-bit words, each identified by a 6-bit address number. As soon as the six bits of the binary counter are identical to the six bits in address storage designating a particular address, the prior art system comparator provides the identity signal referred to above for activating appropriate gating means.

One problem with such prior art systems arises from the time required to propagate carries in the binary counter. Consider a typical recirculating memory bit rate of one megacycle corresponding to the allowance of one microsecond for each bit (one microsecond bit period). The data in the exemplary recirculating memory completes a circulation every 2,048 microseconds (the recirculating memory cycle period). The timing signal source must then cause an 11-bit counter (11 bits are required to count to 2,048) to change its count in one microsecond. Furthermore, the comparison circuit must make its comparison within each microsecond interval if the proper bit cells are to participate in the exchange of data bits with external apparatus. Unless very high speed counting and comparison apparatus is available, typically capable of operating at a 25 mc. rate, carry ripple techniques could not be employed, and carry anticipation circuits needed to enable the counter to change its state and effect comparison on nonchanging bits in the counter.

Accordingly, it is an important object of this invention to provide improved means for exchanging data between a recirculating memory and external apparatus.

It is a further object of the invention to achieve the preceding object with relatively low speed circuitry.

Numerous other features, objects and advantages of the invention will become apparent from the following specification when read in connection with the accompanying drawing in which.

Figure 1:
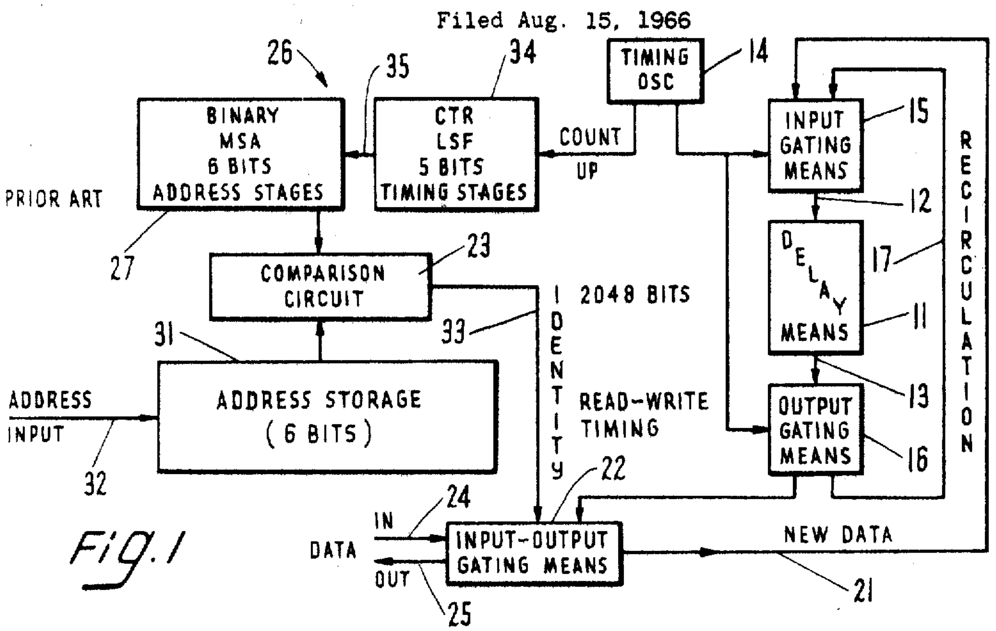
FIG. 1 is a block diagram illustrating the logical arrangement of a conventional recirculating memory.

With reference now to the drawing and more particularly FIG. 1 thereof, there is shown a recirculating memory system employing conventional techniques in which the bit cells for storing the data bits are in a delay means 11, which typically may store 2048 data bits in sequence in serial form, accepting each bit for recirculation on input line 12 and ejecting it on output line 13 in response to each timing pulse provided by timing oscillator 14. The desired synchronism is established through the input gating means 15 and the output gating means 16.

Typically there are means for conditioning the input gating means 15 so that it transfers no data bit signals on recirculation line 17 to input line 12 when new data line 21 is carrying new data bits for insertion into the recirculating storage system. Input-output gating means 22 responds to a signal from comparison circuit 23 for transferring data bits to be stored applied on in line 24 to new data line 21 or transferring stored data to be used externally from output gating means 16 to out line 25 when the count in the 11-bit binary counter 26 first reaches a count whereby the first six most significant bits in address stages 27 correspond to the six-bit address number in address storage 31, the address numbers being received on address input line 32. Comparison circuit 23 continues to provide an identity signal on identity line 32 for the next 32 pulse periods as the timing stages of binary counter 26 with the five least significant bits in timing stages 34 cycle through a complete sequence to provide a carry pulse on line 35 that changes the count in the address stages 27 by one, thereby allowing a complete word of 32 bits to pass through input-output gating means 22.

Figure 3A:
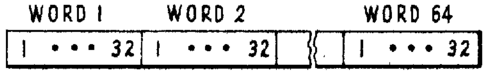
FIG. 3A PRIOR ART

A typical word structure is represented in FIG. 3A of conventional form with 32 contiguous bits of progressively changing significance in the same sense with either the least significant or most significant bit first, depending upon a particular associated system.

Figures 2, 3B:
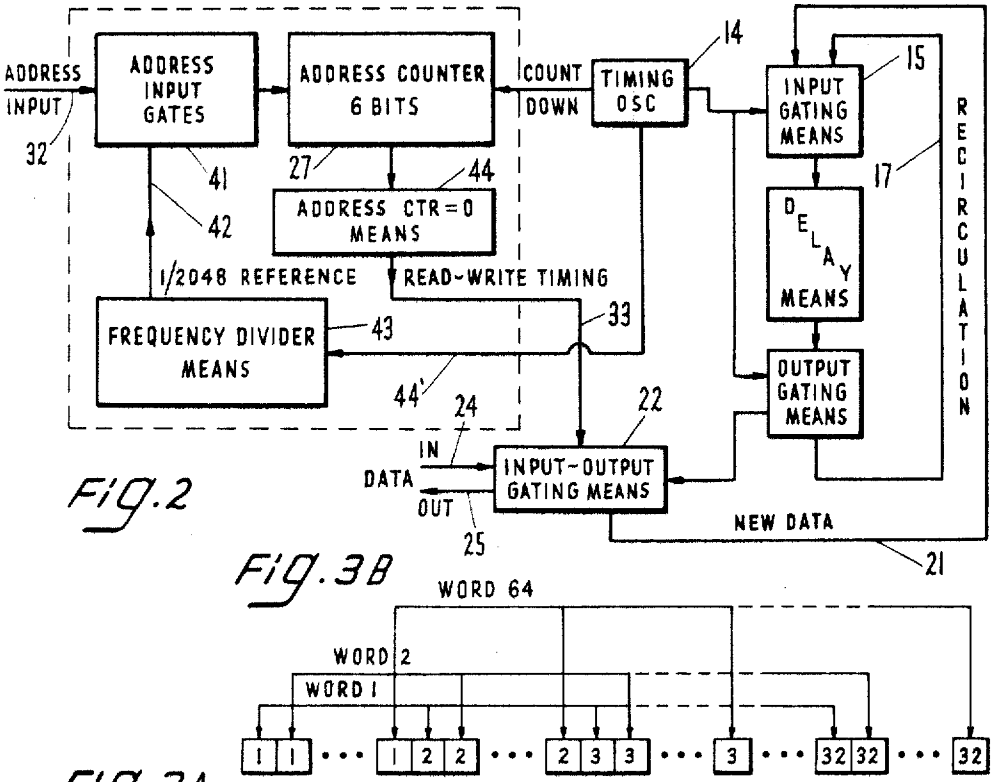
FIG. 2 is a block diagram illustrating the logical arrangement of a recirculating memory system according to the invention.
FIGS. 3A and 3B are a comparison of the word structure in a conventional prior art system compared with the word structure in a system according to the invention.

Referring now to FIG. 2, there is shown a block diagram illustrating the logical arrangement of a system according to the invention. The elements outside the rectangle defined by the broken line are the same as those in the prior art system of FIG. 1 and require no further discussion. However, whereas the read-write timing line 33 enables input-output gating means 22 for 32 consecutive bit periods in the system of FIG. 1, the read-write timing line 33 carries a signal enabling input-output gating means for only a single bit period at 64-bit-period intervals to enable the input-output gating means 22 for 32 such staggered bit intervals during each 2048 bit period recirculation cycle period.

Address input gates 41 are enabled at the start of a recirculation cycle in response to a pulse provided on line 42 by frequency divider means 43 in response to 2048 signals provided by timing oscillator 14 on line 44. Other suitable means may be employed for enabling address input gates 41 at the beginning of a recirculation cycle. The address number signal on address input 32 then sets the count in the six-bit address counter 27 accordingly at the start of a recirculation cycle. Timing oscillator 14 steps address counter 27 downward by one for each bit period until the count reaches zero to cause address counter equal zero means 44 to provide an enabling signal on line 33. Since the next countdown pulse from timing oscillator 14 changes the count in address counter 27 from zero to its maximum binary value of 111111, the enabling signal on line 33 lasts for only one bit period commencing that number of bit periods after the start of the recirculation cycle corresponding to the address number inserted into address counter 27 at the start of the recirculation cycle. Thereafter the downward stepping of address counter 27 during the remainder of the recirculation cycle period causes it to reach zero every 64 bit periods to produce an enabling signal on line 33 every 64 bit periods. Since the recirculating memory stores 64 thirty-two bit words in 2048 bit cells, the system just described is capable of exchanging one 32-bit word each recirculation cycle between a data word group of staggered bit cells in the recirculating memory and external apparatus. At the conclusion of the recirculation cycle frequency divider means 43 again enables address input gates 41 to transfer another address into address counter 27 and initiate the cycle just described.

Referring to FIG. 3B there is shown a representation of the arrangement of word bits in the bit cells of the recirculating memory. Contiguous bit cells store bits of contiguous words instead of contiguous bits of the same word as in the conventional format of FIG. 3A. Thus, the first 64 bit cells in the recirculating memory contain the first bit of each of the 64 words stored therein, the second 64 bit cells store the second bit of each of the 64 words stored in the recirculating memory, and so on with the last 64 bit cells storing the 32nd bit of each of the 64 stored 32-bit words so that consecutive bits of a particular word are stored at 64 bit-cell intervals in the recirculating memory.

The invention has a number of advantages. The address counter equals zero means 44 is simpler than the combination of comparison circuit 23 and address storage 31 needed to produce an enabling signal on line 33 in the prior art system of FIG. 1. There are no carry pulse delay problems because the zero condition is sensed when but a single stage in address counter 27 assumes the zero state. The five-bit timing stages 34 are eliminated so that address counter 27 performs the dual function of both receiving the address number and performing the interval counting to identify the instants of time when a designated bit cell is ready to exchange a data bit. The identification of the zero state can be made while no carries are being propagated, even if carry ripple techniques are used.

Still another advantage of the invention resides in the adaptability of the counter 27 to operate in a self-addressing mode with a relatively slight change in the system of FIG. 2. An inhibiting gate may couple the timing signal from timing oscillator 14 to the count down line of address counter 27, and line 42 from frequency divider means 43 coupled to the inhibit input of such a gate so that the inhibiting gate blocks a timing signal for one bit period at the conclusion of a recirculation cycle. As a result, the address number in address counter 27 at the beginning of the next recirculation cycle is one higher than the address count at the beginning of the recirculation cycle just completed. The result of this arrangement is that successive ordered groups of word bit cells are scanned in consecutive sequence automatically during successive recirculation cycles. That this result would occur is better appreciated by recognizing that in the absence of inhibiting the stepping of the count in address counter 27 and supplying a new address at the beginning of a recirculation cycle, the six-bit counter 27 repeats the count every 2048 bit periods, the duration of a recirculation cycle, to reestablish the last-selected address number in the address counter at the beginning of the next recirculation cycle under such conditions.

The delay line storage may take numerous different forms, such as a shift register, a lumped parameter delay line or a magnetostrictive delay line. The circuit details of the various logical elements represented in block form have not been shown so as not to obscure the principles of this invention. Specific circuitry for implementing the designated logic is well known to those in the computer art and may take any of a wide variety of forms.

The specific numbers employed in this example have been selected for simplicity to better communicate the principles of the invention. In an actual commercial embodiment of the invention, the recirculating delay means 11 is a delay line 3,840 mircroseconds long. Address counter 27 has seven binary stages and selects eighty 48-bit words, the seven-bit address number code consisting of the three least significant bits encoded in straight binary in the low order stages and the four most significant bits in the high order stages being counts by ten in the well-known excess three code. The address counter equals zero means 44 then senses binary zero in the three low order stages and excess three zero in the four higher order stages, corresponding to binary three. The frequency divider means 43 then divides by 3,840 with timing oscillator 14 being a one megacycle oscillator as in the specific example. The resultant system is reliable, relatively inexpensive and effects relatively efficient exchange of digital data with external apparatus.

It is evident that those skilled in the art may now make numerous modifications of and departures from the specific embodiment described herein without departing from the inventive concepts. Consequently, the invention is to be construed as embracing each and every novel feature and novel combination of features present in or possessed by the apparatus and techniques disclosed herein and to be construed as limited solely by the spirit and scope of the appended claims.

What is claimed is:

1. Data processing apparatus comprising, a source of a timing signal defining a data bit rate, storage means defining a recirculating memory for storing data bits and advancing them at said data bit rate, said storage means having a plurality of contiguous data bit cells for storing a plurality of multi-bit data words with consecutive bits in a data word being stored in spaced ones of said data bit cells defining a data word group separated by a predetermined number of said data bit cells and characterized by a recirculation cycle in which each of said data bit cells is conditioned during one bit period to exchange a data bit with external apparatus with the address of a said data word group of said data bit cells in said storage means being designated by an address number corresponding to the occurrence of the bit period in which a data bit cell of the latter group is conditioned to exchange a data bit with external apparatus relative to the start of said recirculation cycle, counter means responsive to said timing signal for stepping the count therein by one for each bit period, a source of an address number signal, means responsive to said address number signal for establishing the initial count of said counter means corresponding to the address number of a designated data word group of said data bit cells selected for exchanging a data word with external apparatus, identity means responsive to the occurrence of said counter means having a predetermined count for providing a transfer signal that conditions a data bit cell in said designated data word group for exchanging a data bit with external apparatus for one bit period, means responsive to said timing signal for establishing said predetermined count in said counter means every said predetermined number of said bit periods during the remainder of said recirculation cycle, and means responsive to the completion of a recirculation cycle for conditioning said counter means to receive another address number signal from said source thereof.

2. Data processing apparatus in accordance with claim 1 wherein said counter means comprises a plurality of cascaded counting stages and said predetermined count occurs immediately following a change in state of only one of said counting stages.

3. Data processing apparatus in accordance with claim 2 wherein said predetermined count is zero and said counter means includes means responsive to said timing signal for retarding the count therein by one for each bit period.

4. Data processing apparatus in accordance with claim 3 wherein said means responsive to the completion of a recirculation cycle includes address input gating means for transferring said address number signal when enabled to said counter means for establishing said initial count at the start of each recirculation cycle, and means responsive to said timing signal for providing an enabling signal to said address input gating means upon the occurrence of that number of bit periods corresponding to the duration of a recirculation cycle.

5. Data processing apparatus in accordance with claim 4 wherein said storage means includes, delay means having an input and an output for furnishing a delay in bit periods corresponding to the period of said recirculation cycle.

input gating means responsive to said timing signal for transferring a data bit to the input of said delay means during each bit period, output gating means responsive to said timing signal for transferring a data bit from the output of said means during each bit period, means defining a recirculation line intercoupling said input gating means and said output gating means whereby a data bit extracted from said delay means output through said output gating means may be transferred to said delay means input through said input gating means, and input-output gating means for selectively coupling one of said input gating means and said output gating means to external apparatus when enabled by said transfer signal provided by said identity means.

6. Data processing apparatus in accordance with claim 5 wherein said counter means comprises a plurality of cascaded binary stages and reaches said predetermined count when the binary stage corresponding to the least significant bit changes from the ONE state to the ZERO state and said address number corresponds to the number of bit periods between the start of a recirculation cycle and the occurrence of the first bit in a said word group.

References Cited

UNITED STATES PATENTS

| | | | |
|---|---|---|---|
| 3,257,645 | 6/1966 | Lekven | 340—172.5 |
| 3,273,131 | 9/1966 | Strohm et al. | 340—172.5 |
| 3,289,171 | 11/1966 | Scherr et al. | 340—172.5 |

PAUL J. HENON, *Primary Examiner.*

R. B. ZACHE, *Assistant Examiner.*